(12) United States Patent
Van Den Hurk et al.

(10) Patent No.: US 9,749,177 B2
(45) Date of Patent: Aug. 29, 2017

(54) METHOD AND APPARATUS FOR DYNAMIC ADDRESS ASSIGNMENT

(71) Applicant: PHILIPS LIGHTING HOLDING B.V., Eindhoven (NL)

(72) Inventors: Gerardus Johannes Franciscus Maria Van Den Hurk, Oss (NL); John Edgar Held, Eindhoven (NL); Anne Arne Schurer, 'S-Hertogenbosch (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 86 days.

(21) Appl. No.: 14/429,936

(22) PCT Filed: Sep. 13, 2013

(86) PCT No.: PCT/IB2013/058525
§ 371 (c)(1),
(2) Date: Mar. 20, 2015

(87) PCT Pub. No.: WO2014/045175
PCT Pub. Date: Mar. 27, 2014

(65) Prior Publication Data
US 2015/0256384 A1 Sep. 10, 2015

Related U.S. Application Data

(60) Provisional application No. 61/704,387, filed on Sep. 21, 2012.

(51) Int. Cl.
*G06F 15/16* (2006.01)
*H04L 12/24* (2006.01)
(Continued)

(52) U.S. Cl.
CPC .......... *H04L 41/08* (2013.01); *H04L 61/2015* (2013.01); *H04L 61/2038* (2013.01); *H04L 67/16* (2013.01); *H05B 37/0254* (2013.01)

(58) Field of Classification Search
CPC . H04L 41/08; H04L 61/2015; H04L 61/2038; H04L 67/16; H05B 37/0254
(Continued)

(56) References Cited

U.S. PATENT DOCUMENTS 5,812,819 A * 9/1998 Rodwin ............ H04L 29/12311
703/23
5,835,725 A * 11/1998 Chiang ................... H04L 29/06
709/228

(Continued)

FOREIGN PATENT DOCUMENTS

EP 1503262 A2 2/2005
EP 2587772 A1 5/2013
(Continued)

*Primary Examiner* — Melvin H Pollack
(74) *Attorney, Agent, or Firm* — Akarsh P. Belagodu

(57) ABSTRACT

The present invention relates to an address assignment procedure where an address request containing a unique identification is sent to a predefined address of a network, and the role of an address assignment master is taken over in response to the receipt of a non-acknowledging response to the address request. Standard intelligent building blocks can thus be used to create a large product portfolio. The intelligent building blocks are connected to each other via a network and addresses can be assigned without needing additional process steps, human interaction or factory/field-service tooling.

11 Claims, 2 Drawing Sheets

(51) Int. Cl.
  *H04L 29/12* (2006.01)
  *H04L 29/08* (2006.01)
  *H05B 37/02* (2006.01)

(58) Field of Classification Search
  USPC .......................................................... 709/220
  See application file for complete search history.

(56) References Cited

U.S. PATENT DOCUMENTS

| | | | | |
|---|---|---|---|---|
| 6,018,771 A * | 1/2000 | Hayden | ................... | H04L 12/18 709/231 |
| 6,115,545 A * | 9/2000 | Mellquist | ................ | H04L 29/06 709/220 |
| 6,778,540 B1 * | 8/2004 | Ratcliff | ................... | H04L 12/46 370/389 |
| 6,967,565 B2 * | 11/2005 | Lingemann | ................ | G05B 15/02 340/12.23 |
| 6,985,431 B1 * | 1/2006 | Bass | ................... | G06F 13/4022 370/235 |
| 7,120,725 B2 * | 10/2006 | Sandy | ..................... | H04L 69/08 709/238 |
| 7,243,131 B1 * | 7/2007 | Inoue | ..................... | G11B 19/02 709/208 |
| 7,337,232 B2 * | 2/2008 | Unger | ..................... | G06F 13/28 709/217 |
| 7,382,271 B2 * | 6/2008 | McFarland | ............ | G05B 15/02 340/539.2 |
| 7,401,166 B2 * | 7/2008 | Herfet | ..................... | H04B 1/205 710/16 |
| 7,412,515 B2 * | 8/2008 | Kupst | ..................... | H04L 29/12216 709/220 |
| 7,523,225 B2 * | 4/2009 | Saint-Hilaire | .... | H04L 29/12009 710/10 |
| 7,533,191 B2 * | 5/2009 | Dunstan | .............. | G06F 13/4291 710/3 |
| 7,581,031 B2 * | 8/2009 | Konz | ................... | G06F 13/4068 709/223 |
| 7,650,323 B2 * | 1/2010 | Hesse | ................... | G05B 15/02 706/62 |
| 7,698,413 B1 * | 4/2010 | Minami | ................... | H04L 69/16 370/463 |
| 7,809,806 B1 * | 10/2010 | Rao | ..................... | H04L 41/0803 709/220 |
| 7,904,187 B2 * | 3/2011 | Hoffberg | ................ | G05B 15/02 370/200 |
| 7,987,247 B2 * | 7/2011 | Westphal | ............... | G05B 15/02 370/252 |
| 7,990,908 B2 * | 8/2011 | Binder | ................ | H04L 12/2803 370/318 |
| 8,011,794 B1 * | 9/2011 | Sivertsen | ........... | H05B 33/0803 362/231 |
| 8,046,640 B2 * | 10/2011 | Barthel | ............. | G05B 19/0421 710/301 |
| 8,050,801 B2 * | 11/2011 | Richards | ................ | F24F 11/006 370/254 |
| 8,055,743 B2 * | 11/2011 | Frutiger | .............. | H04L 41/0806 709/221 |
| 8,100,552 B2 * | 1/2012 | Spero | ....................... | B60Q 1/04 362/227 |
| 8,116,309 B2 * | 2/2012 | Sharma | ................... | H04L 12/66 370/389 |
| 8,194,659 B2 * | 6/2012 | Ban | ..................... | H04L 12/1863 370/389 |
| 8,257,157 B2 * | 9/2012 | Polchin | ................... | A63F 13/02 463/9 |
| 8,495,268 B2 * | 7/2013 | Hirano | .................. | G06F 13/385 710/13 |
| 8,566,490 B2 * | 10/2013 | Weidenkeller | ........ | G06F 13/385 710/110 |
| 8,572,305 B2 * | 10/2013 | Weddingfeld | .... | H04L 12/40006 710/104 |
| 8,650,306 B2 * | 2/2014 | Pouchak | .......... | H04L 41/0803 709/227 |
| 8,650,335 B2 * | 2/2014 | Brice, Jr. | ............. | G06F 11/349 710/20 |
| 8,655,182 B2 * | 2/2014 | Tanaka | ................... | H04B 10/40 398/135 |
| 8,744,267 B2 * | 6/2014 | Pederson | .......... | H04B 10/1143 398/127 |
| 8,799,443 B2 * | 8/2014 | Schmidt | ................ | H04L 61/103 709/203 |
| 8,850,528 B2 * | 9/2014 | Van Biljon | ............ | G06Q 30/04 707/783 |
| 8,868,695 B2 * | 10/2014 | Grube | ................. | H04L 67/1097 709/220 |
| 8,898,123 B2 * | 11/2014 | Britt | ...................... | G06F 9/4443 707/697 |
| 8,949,364 B2 * | 2/2015 | Miloushev | .............. | G06F 9/485 709/212 |
| 8,984,423 B2 * | 3/2015 | Mann | ..................... | G06F 3/0481 715/762 |
| 9,116,789 B2 * | 8/2015 | Driever | ................ | G06F 12/0246 711/104 |
| 9,264,252 B2 * | 2/2016 | Ebrom | .................. | D06F 39/005 |
| 9,351,193 B2 * | 5/2016 | Raleigh | ................. | H04M 15/80 |
| 9,411,532 B2 * | 8/2016 | Vorbach | ................ | G06F 3/0647 |
| 2004/0111501 A1 | 6/2004 | Lee et al. | | |
| 2005/0055418 A1 | 3/2005 | Blanc et al. | | |
| 2007/0073948 A1 * | 3/2007 | Hamao | ................ | G06F 13/374 710/110 |
| 2008/0288617 A1 | 11/2008 | Gillet | | |
| 2009/0193166 A1 | 7/2009 | Kropp et al. | | |
| 2011/0208939 A1 * | 8/2011 | Takizawa | ............ | G06F 12/0638 711/167 |
| 2011/0314506 A1 * | 12/2011 | Agarwal | ................ | H04L 1/1607 725/62 |

FOREIGN PATENT DOCUMENTS

| | | |
|---|---|---|
| JP | 2006267850 A | 10/2006 |
| JP | 2007074715 A | 3/2007 |
| WO | 9501026 A1 | 1/1995 |
| WO | 9501027 A1 | 1/1995 |
| WO | 2012087946 A1 | 6/2012 |

* cited by examiner

METHOD AND APPARATUS FOR DYNAMIC ADDRESS ASSIGNMENT

CROSS-REFERENCE TO PRIOR APPLICATIONS

This application is the U.S. National Phase application under 35 U.S.C. §371 of International Application No. PCT/IB2013/058525, filed on Sep. 13, 2013, which claims the benefit of U.S. Provisional Patent Application No. 61/704,387, filed on Sep. 21, 2012. These applications are hereby incorporated by reference herein.

FIELD OF THE INVENTION

The present invention relates to the field of an apparatus, method and computer program product for performing address assignment in a communication network such as—but not limited to—a ZigBee Light Link (ZLL) network for intelligent lighting solutions or an I2C bus system for communication between a CPU and peripheral chips.

BACKGROUND OF THE INVENTION

Dynamic address assignment can be achieved in various ways. As an example, the Dynamic Host Configuration Protocol (DHCP) is a known protocol used in Internet Protocol (IP) based networks. DHCP assigns unique addresses to each device in the network. To achieve this, a dedicated computer is needed as DHCP server. Within Zigbee, a dedicated node, called the controller, is needed to assign addresses to all devices in the Zigbee network.

The trend is to compose systems by building a system as a network of standard re-useable building blocks. These building blocks may have a single function, i.e. light generation or presence sensing. Re-use of intelligent building blocks is an approach to create a large product portfolio with only a limited set of building blocks. The combination of intelligent building blocks in a system can be flexible and may not be known beforehand.

Each device in a network needs to be uniquely identifiable and addressable. Therefore, in a networked system, each building block in the network should be known and should have a unique network address. To achieve this, connecting multiple identical devices needs additional configuration of the device addresses, either in the factory or in the field. The unique addresses shall be assigned to each device, before these devices are combined in the system. At production time of a device it is not known in which system the device is used, so it is not possible to assign a unique address to the device.

Thus, when the network or system is manufactured or composed, an extra process step is needed to assign unique addresses to each device in the system. However, this process step is error-prone, since multiple identical devices are used in the system and these devices may not be mixed-up after the unique addresses have been assigned. Due to cost, complexity, and physical foot-print reasons the addition of one or more extra devices that only contain network functions is not acceptable.

SUMMARY OF THE INVENTION

It is an object of the invention to provide dynamic address assignment to each node in a network without the need of a dedicated 'address assigner' node.

This object is achieved by an apparatus as claimed in claim 1, a building block device as claimed in claim 6, a system as claimed in claim 9, a method as claimed in claim 11, and a computer program product as claimed in claim 12.

Accordingly, an address request containing a unique identification is sent to a predefined address of the network, and the role of an address assignment master is taken over in response to the receipt of a non-acknowledging response to the address request. Thereby, all devices in the system can be discovered automatically and a unique address can be assigned to each device in the system, while each device is able to perform the address assignment role. No dedicated device that performs the address assignment function only needs to be provided in the system.

Moreover, the proposed solution does not require a fixed pre-defined start-up order of devices nor are there any requirements on the start-up time of a device. A device is detected on the bus or network connection as soon the dynamic address assignment is started; hot-plugging is intrinsic supported and it is not mandatory for a device to take over the 'address assigner' role, so that a smaller and cheaper micro-controller can be used in the device. If the device does not take over the role, the device may repeat transmitting the address request message at a defined interval until it receives a hardware address.

According to a first aspect, a bus system of the communication network may be occupied after the address request has been sent and until a response to the address request has been received. Thereby, interference with other devices connected to the bus system can be prevented. As an example, this can be achieved by issuing a repeated start read command to the bus system.

According to a second aspect which may be combined with the above first aspect, upon receipt of an acknowledging response to the address request, it may be concluded that an address assignment master is already present in the communication network and it may be waited for an assigned address from the address master. This ensures that only one address assignment master is provided in the communication network and that unique addresses are assigned to network devices.

According to a third aspect which can be combined with any one of the first and second aspects, a network driver from which non-acknowledging response has been received may be released after takeover of the role of the address assignment master.

According to a fourth aspect which can be combined with any one of the first to third aspects, the building block device may comprise a dimmable light engine, a colour tunable light engine, a daylight sensor, a presence sensor, a DALI interface or a DMX interface, or may alternatively comprise an input/output (I/O) interface.

It is noted that the apparatus may be implemented as a discrete hardware circuitry with discrete hardware components, as an integrated chip, as an arrangement of chip modules, or as a signal processing device or chip controlled by a software routine or program stored in a memory, written on a computer readable medium, or downloaded from a network, such as the Internet.

It shall be understood that the substance determining apparatus of claim 1, the building block device of claim 6, the system of claim 9, the method of claim 11, and the computer program product of claim 12 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Various embodiments of the present invention will now be described based on an address assignment process in a bus-based network system, where each device connected to the bus has a unique identifier. Furthermore, no pre-defined address assignment master is provided in the system, so that there is no mandatory address master device needed in the system. Each device has the capability to assign unique addresses, e.g. can operate as an address assignment master and it is guaranteed that only one address master role is assigned in the system. Moreover, each device in the system is discovered automatically and a unique address is assigned to each device in the network.

Figure 1:
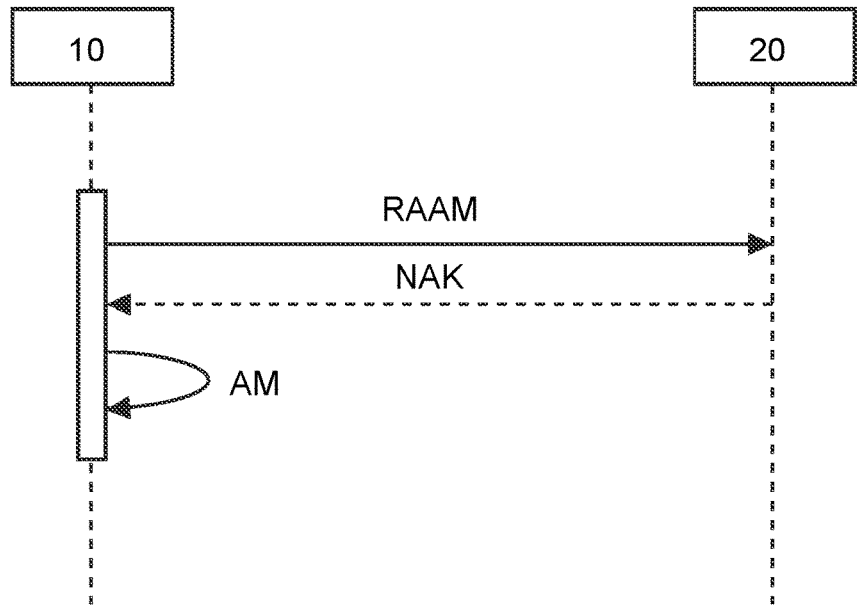
FIG. 1 shows a processing and signaling diagram of a takeover scenario of an address assignment master role according to a first embodiment.

FIG. 1 shows a processing and signaling diagram of a takeover scenario of an address assignment master role according to a first embodiment. In the first embodiment, signaling from an initiating device 10 is performed via a network driver 20 which may be a software module or interface card that activates the actual transmission and receipt of data over the network. It may provide the data link protocol (Ethernet, Token Ring, etc.) that controls a network adapter installed in the device 10. The address assignment process may run after each system power-up, and this process may be identical for each device. The time needed for address assignment process should be very limited so that delays are hardly visible by the end-user.

As already mentioned, a pre-requisite is that each device on the network has a unique identifier. Since the devices have a central processing unit (CPU) on board, the global unique identification or identity (ID) that is pre-programmed by the CPU manufacturer can be used. Of course, other unique identifications of the devices may be used as well.

According to FIG. 1, at start-up the device 10 transmits a 'request address assignment master' message (RAAM) via the network driver 20 to the network. The message is sent to a pre-defined and fixed address and contains the unique ID of the device 10. If the network driver 20 does not see any reaction (e.g. response or other signaling) on the message by the network, it assumes that the device 10 is the first device on the network. This is signaled by the network driver 20 to the device 10 by sending a negative acknowledgement or non-acknowledgement (NAK). In response thereto, this device 10 takes over the role of the address assignment master (AM) and thus becomes the address assignment master and releases a bus or other network connection.

Figure 2:
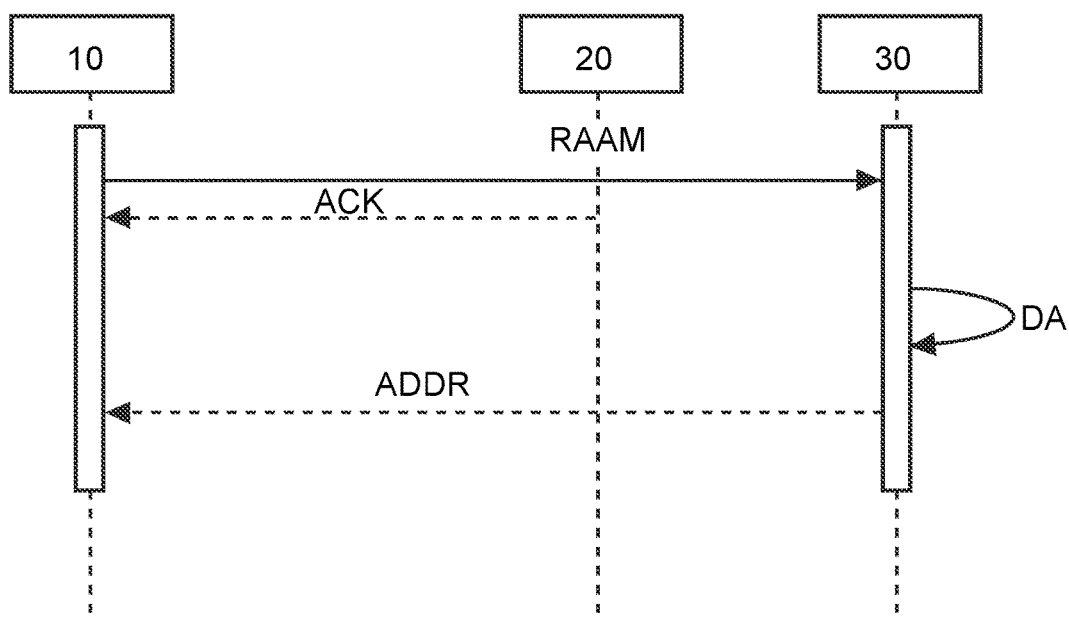
FIG. 2 shows a processing and signaling diagram of an address assignment scenario according to the first embodiment.

FIG. 2 shows a processing and signaling diagram of an address assignment scenario according to the first embodiment.

Contrary to the scenario of FIG. 1, if the network driver 20 notices or detects a reaction (e.g. response or other signaling) on the network, it assumes that there is already another device available in the network. The present device 10 which has sent the 'request address assignment master' message (RAAM) is thus not the first device in the network, and therefore it can be concluded that an address master is already present in the network. The network driver 20 signals this to the device 10 by sending a positive acknowledgement (ACK). Neither the device 10 nor the network driver 20 release the bus after the request has been send, which prevents that other devices interfere with this address assignment sequence.

The 'request address assignment master' message sent by the device 10 to the network via the network driver 20 is answered by the address master 30 and contains an assigned unique network address for the device 10.

The above procedure is repeated for each new device and at the end of the resulting address assignment sequence all devices in the system have been discovered and all devices have a unique address.

In the following, a second embodiment which relates to an examplary I2C bus application is described with reference to FIGS. 3 and 4

I2C (Inter-Integrated Circuit; generically referred to as "two-wire interface") is a multi-master serial single-ended computer bus that can be used to attach low-speed peripherals to a motherboard, embedded system, cell phone, or other electronic device. The I2C bus allows easy communication between a central processing unit (CPU) and peripheral chips or devices and is originally designed to connect different IC's on a single board. This implies that the I2C bus and the peripheral chips connected to this bus is a static system.

Each device, i.e. the CPU and the peripheral devices, on the I2C bus shall have a unique and fixed address. This address is normally fixed in the peripheral device or can be set by hardwiring pins. In the second embodiment, a system can be created by connecting intelligent building blocks via an I2C bus. As required by the I2C bus, each intelligent building block shall be uniquely identifiable and addressable. The unique addresses can be assigned to each device 10 before these devices 10 are combined in the system. Since at production time of a device 10 it is not known in which system the device is used, it is not possible to assign a unique address to the device beforehand.

When the principle of the present invention is applied to intelligent building blocks in an I2C network according to the second embodiment, the intelligent building blocks can be connected to the I2C bus as-is. No configuration is needed. Furthermore, no dedicated device is needed for address assignment.

Figure 3:
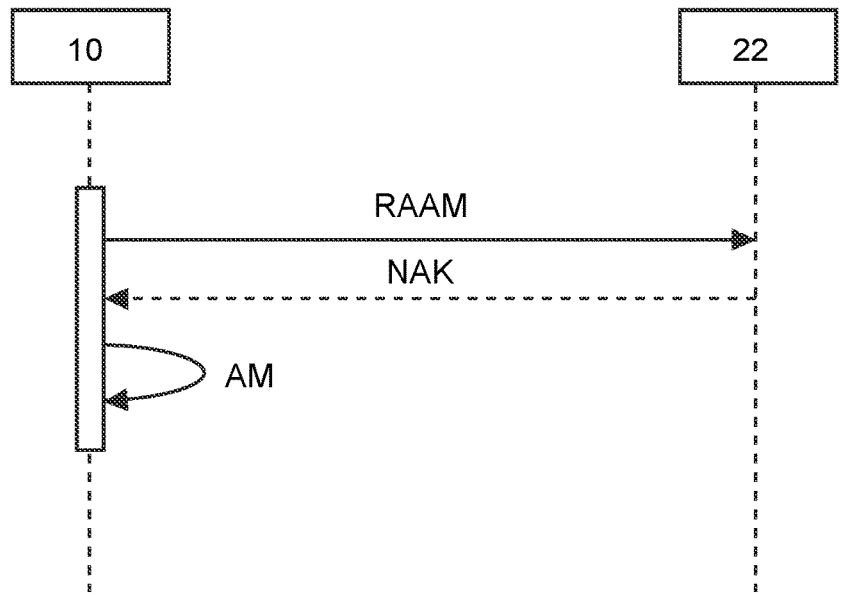
FIG. 3 shows a processing and signaling diagram of a takeover scenario of an address assignment master role according to a second embodiment.

FIG. 3 shows a processing and signaling diagram of a takeover scenario of an address assignment master role in an I2C network according to the second embodiment.

At start-up a new building block device 10 transmits a 'request address assignment master' message (RAAM) on the I2C bus 22. As in the first embodiment, the message is sent to a pre-defined and fixed address, and the message contains a unique ID of the new building block device. If there are no other building block devices on the I2C bus 22, this is indicated with a negative acknowledgement or non-acknowledgement (NAK). The new building block device 10 can thus conclude that it is the first device on the I2C bus 22, and can take over the role of the address assignment master and becomes the address assignment master.

Figure 4:
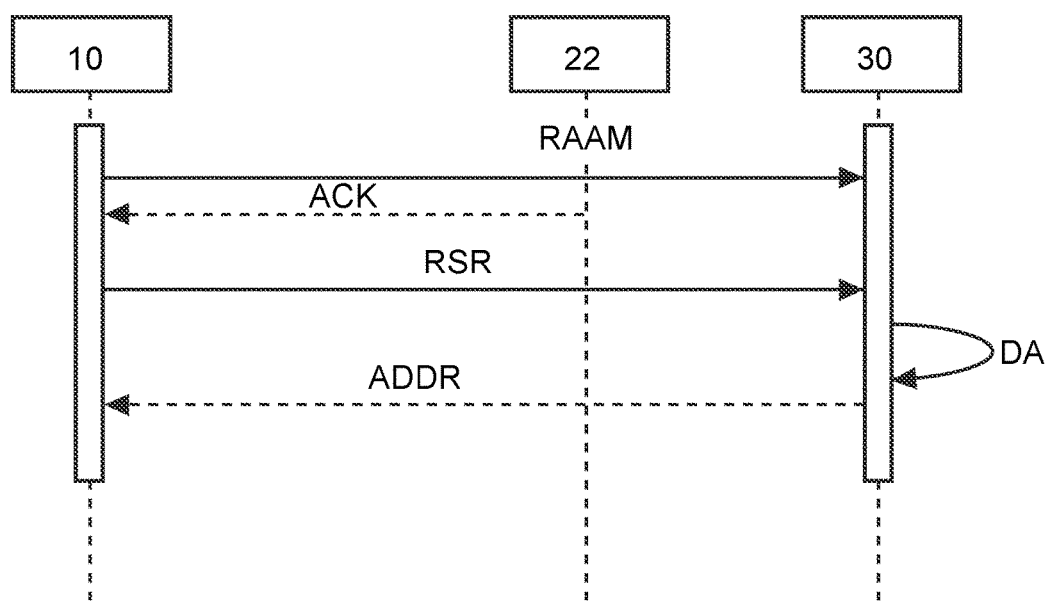
FIG. 4 shows a processing and signaling diagram of an address assignment scenario according to the second embodiment.

FIG. 4 shows a processing and signaling diagram of an address assignment scenario according to the second embodiment Contrary to the scenario of FIG. 3, if an address assignment master 30 is already available on the I2C bus, the message is replied with a positive acknowledgement (ACK). The new building block device 10 keeps the I2C bus blocked for access by other devices, e.g., by performing an I2C Repeated Start Read command (RSR). The I2C protocol defines a so-called repeated start condition. After having sent the address byte (address and read/write bit) the master may send any number of bytes followed by a stop condition. Instead of sending the stop condition it is also allowed to send another start condition again followed by an address (and of course including a read/write bit) and more data. This is defined recursively allowing any number of start conditions to be sent. The purpose of this is to allow combined write/read operations to one or more devices without releasing the bus and thus with the guarantee that the operation is not interrupted.

The address assignment master 30 then responds with the bus address for the new building block device 10.

Again, at the end of the address assignment sequence all devices in the system have been discovered and all devices have a unique address.

In summary, the present invention relates to an apparatus, system, method, and computer program product for performing address assignment in a network. An address request containing a unique identification is sent to a predefined address of the network, and the role of an address assignment master is taken over in response to the receipt of a non-acknowledging response to the address request. Standard intelligent building blocks can thus be used to create a large product portfolio. The intelligent building blocks are connected to each other via a network and addresses can be assigned without needing additional process steps, human interaction or factory/field-service tooling.

While the invention has been illustrated and described in detail in the drawings and the foregoing description, such illustration and description are to be considered illustrative or exemplary and not restrictive. The invention is not limited to the disclosed embodiments and can be used for wired or non-wired networks with an address assignment function. As an example, an application area for the present invention is in the lighting domain. By defining a limited set of intelligent building blocks (i.e. a dimmable light engine, a colour tuneable light engine, a daylight sensor, presence sensor, a digitally addressable lighting interface (DALI), or a digital multiplex (DMX) interface) a large portfolio of luminairs can be made. Thus, the devices 10 of the above embodiments can be intelligent building blocks of a lighting system. According to another application area, the present invention can be used for systems that offer a flexible number of I/O ports which correspond to the devices 10 of the above embodiments. The system can be provided with e.g. 4 I/O ports, but by stacking the I/O ports the number of supported I/O ports can easily be extended. The number of available I/O ports can be discovered, and all I/O ports are uniquely addressable by applying the procedures of the present invention.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. As already mentioned above, the functions of the network discovery procedure, e.g. as described in connection with the above embodiments of FIG. 6, may be implemented as software routines or computer programs which may be stored/distributed on a suitable medium such as an optical storage medium or a solid-state medium supplied together with or as a part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:

1. An apparatus for controlling address assignment in a communication network, wherein a unique address is assigned to each device of the network in sequence, said apparatus comprising a network driver and being adapted to send an address request containing a unique identification of said apparatus to a predefined address of said network via the network driver, and wherein said apparatus is adapted to take over the role of an address assignment master in response to the receipt of a non-acknowledging response created by the network driver upon observing no reaction to said address request, and wherein the apparatus is adapted to occupy a bus system of the network after the address request has been sent and until a response to the address request has been received.

2. The apparatus according to claim 1, wherein said apparatus is adapted to occupy said bus system by issuing a repeated start read command.

3. The apparatus according to claim 1, wherein said apparatus is adapted to conclude that an address assignment master is already present in said communication network and to wait for an assigned address from said address master, if it has received an acknowledging response to said address request.

4. The apparatus according to claim 1, wherein said apparatus is adapted to release the network driver from which the non-acknowledging response has been received, after takeover of said role of said address assignment master.

5. A building block device for use in a network of building block devices which compose a predetermined system, said building block device comprising an apparatus according to claim 1.

6. The building block device according to claim 5, wherein said building block device comprises a dimmable light engine, a colour tunable light engine, a daylight sensor, a presence sensor, a DALI interface or a DMX interface.

7. The building block device according to claim 6, wherein said building block device comprises an input/output interface.

8. A system comprising at least two building block devices according to claim 6.

9. The system of claim 8, wherein said at least two building blocks devices are connected via an I2C bus.

10. A method of controlling address assignment in a communication network, wherein a unique address is assigned to each device of the network in sequence, said method comprising:
- a) sending an address request containing a unique identification to a predefined address of said network,
- b) taking over the role of an address assignment master in response to the receipt of a non-acknowledging response created by a network driver upon observing no reaction to said address request, and
- c) occupying a bus system of the network after the address request has been sent and until a response to the address request has been received.

11. A computer program product comprising code means adapted to produce the steps of method claim 10 when run on a computing device.

* * * * *